Nov. 22, 1960  R. L. ATKIN  2,961,272
QUICK ACTING WHEEL CLAMP
Filed May 14, 1956  2 Sheets-Sheet 1
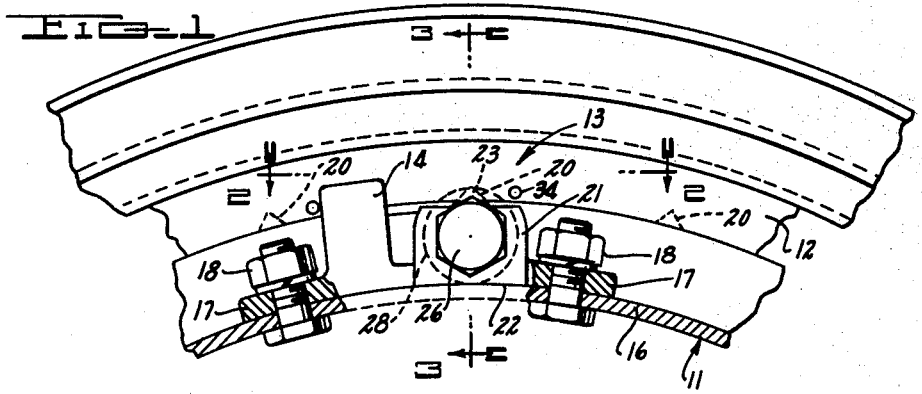
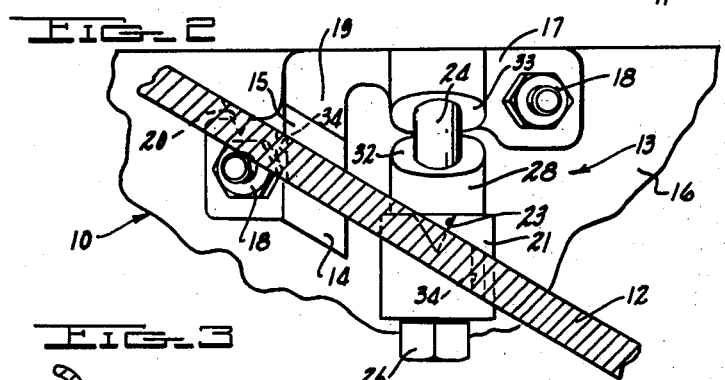
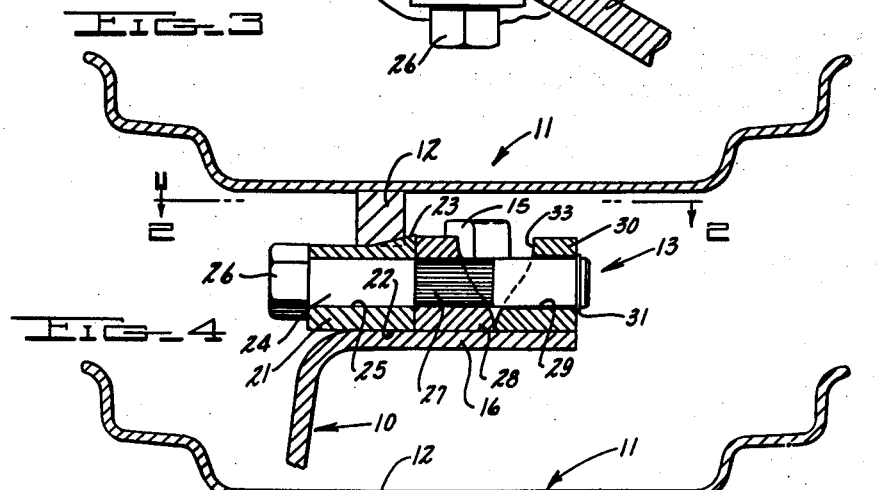
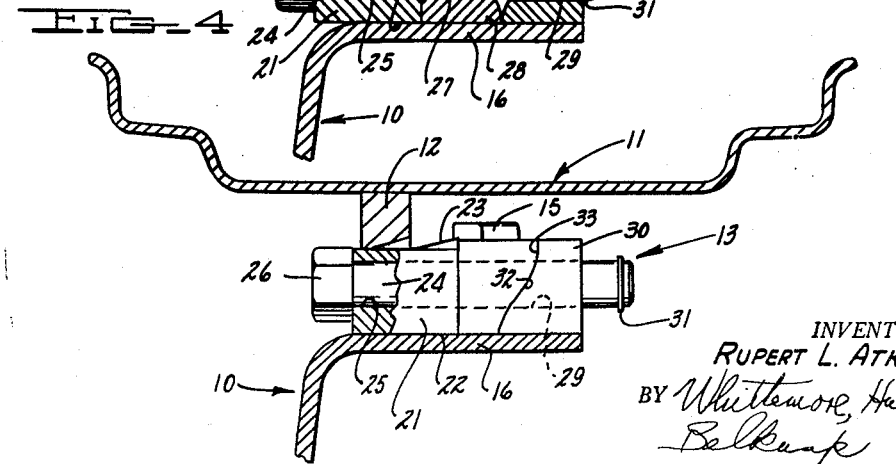
INVENTOR.
RUPERT L. ATKIN
BY
ATTORNEYS

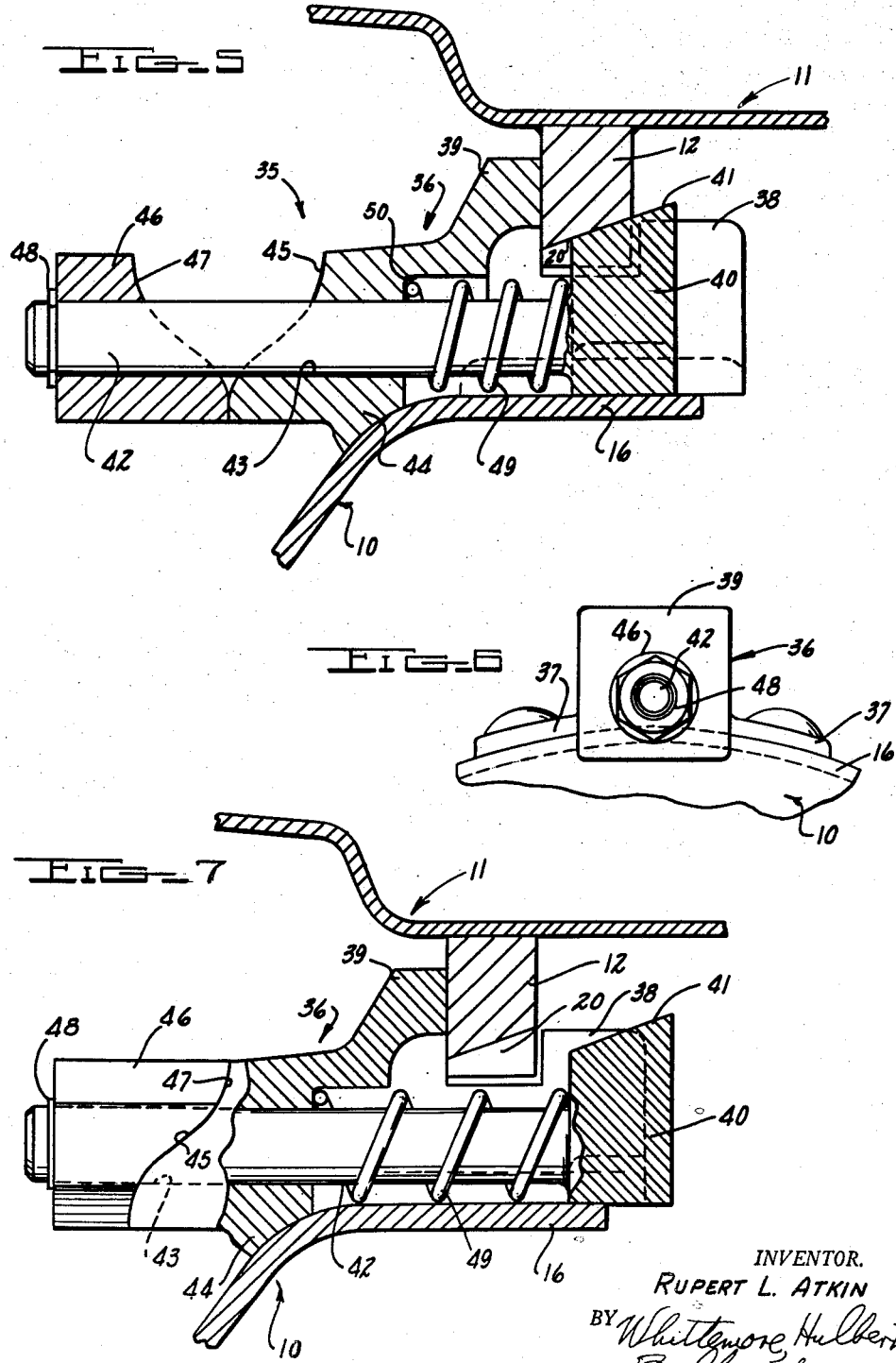

United States Patent Office 2,961,272
Patented Nov. 22, 1960

2,961,272

QUICK ACTING WHEEL CLAMP

Rupert L. Atkin, Grosse Pointe Woods, Mich., assignor to Kelsey-Hayes Company, a corporation of Delaware Filed May 14, 1956, Ser. No. 584,731

3 Claims. (Cl. 301—9)

The present invention relates to improvements in adjustable tread wheels for tractors and like vehicles, and more particularly to a quick acting clamp to secure the wheel rim to the wheel disk or body in different axially adjusted positions.

The invention deals more particularly with a wheel having inclined rail members on its inner rim periphery in camming engagement with guides on the wheel disk or body to cause the desired axial adjustment upon relative rotation of the rim and body.

An objection to adjustable tread wheel structures in present use resides in the excessive time required to release the rim for the adjustment, and then reclamp it to the wheel body following adjustment. In order to secure an adequately strong driving connection between the wheel body and rim it has been necessary to employ multiple bolt type clamps to hold the adjusted wheel members securely. Undue effort and time are expended in backing off and restoring such threaded devices each time an adjustment is made.

Moreover, the clamp parts, threaded and otherwise, are usually exposed to ready damage by impact, corrosion, jamming and like hazards to proper operation.

Another adjustable thread clamp arrangement which has been proposed employs parts which inherently require accurate interfit for proper operation. Such parts and their mountings cannot be held to necessary and uniform close tolerance in mass production, hence a time-consuming and wasteful selective assembly procedure is in order in each instance to insure the production of a properly functioning wheel. This is obviously impractical costwise.

It is therefore a general object of the invention to provide an adjustable tread wheel which incorporates improved quick acting clamp means capable of being manipulated to release and/or reclamp the rim in a small fraction of the time heretofore required by most clamps, yet in which the operating parts are not vulnerable to impairment of operation due to abrasion, corrosion and the like.

Another object is to provide a quick acting clamp as just described, in which neither of the required manual releasing or reclamping operations require more than one half turn of a rotative actuator of the clamp.

A further object is to provide a quick acting clamp which does not involve parts inherently necessitating selective assembly but is, on the contrary, made up of mass produced components fully interchangeable in any intended assembly.

More specifically, the invention affords a quick acting wheel clamp comprising a clamping head mounted on one of a pair of rim and wheel members for axial movement to clampingly engage and disengage an element on the other member without substantial chording of the latter, together with a quick take up and release actuator for the head including coacting face cam members of which one is rotated no more than one-half turn relative to the other in the release movement, and a similar part rotation to effect reclamping.

The foregoing as well as other objects will be made more apparent as this description proceeds, especially when considered in connection with the accompanying drawings, wherein:

Fig. 1 is a fragmentary side elevational view of a variable tread wheel structure embodying the improved clamp of the invention, as viewed from the outer side of the wheel, the clamp being shown in a rim clamping position;

Figs. 2 and 3 are, respectively, fragmentary views in section along lines 2—2 and 3—3 of Fig. 1;

Fig. 4 is a fragmentary view in section similar to Fig. 3, but showing the clamp in a rim releasing position;

Fig. 5 is a fragmentary sectional view, generally similar to Fig. 3, showing a modified embodiment of the invention, with the clamp in an operative, clamping position;

Fig. 6 is a fragmentary side elevational view of the embodiment of Fig. 5; and

Fig. 7 is a fragmentary view in section similar to Fig. 5, with the clamp in released position.

The reference numeral 10 generally designates in Fig. 3 a portion of a conventional wheel body or disk, as of the adjustable tread wheel of a tractor, and a conventional rim 11 is associated with the wheel body 10 for axial adjustment inwardly and outwardly of the latter upon relative rotation of the two members. To this end, the rim 11 has a plurality of rail lengths 12 secured, as by welding, to its inner peripheral surface, the rails inclining axially along their length.

The reference numeral 13 generally designates the quick acting clamp of the invention. It includes a pair of axially spaced guide lugs 14, 15 rigidly mounted to the wheel body 10, the lugs radially outwardly straddling the rail 12, so that upon relative rotation of the wheel body 10 and rim 11 the latter will be caused to travel relatively in one axial direction or the other. The mounting provisions for the guide lugs 14, 15 are hereinafter described in greater detail.

The wheel body 10 has axially inwardly extending flanges 16 spaced about its periphery, to which flanges mounting brackets 17 of the clamps 13 are bolted at 18 adjacent opposite circumferential ends of the bracket. As illustrated in Figs. 1 and 2, the guide lugs 14, 15 are formed as a radially outer forked extension of an arm 19 integral with the bracket 17. They lie relatively closely adjacent opposite faces of the rail 12 to provide effective abutments to sustain axial thrust in adjusting, yet not in such close relation as to cause undue friction in the adjusting operation. As shown in Fig. 1, the bracket is shaped on its radially inner surface in conformity with the curvature of the flange 16, having flush engagement with the same throughout the circumferential length of the bracket.

The rail 12 is formed with a plurality of clamping notches 20, in spaced relation to one another along its radially and axially inner surfaces. These notches are of triangular cross section (Fig. 1) and they taper convergently from the inner axial side of the rail 12 to a point on its radially inner surface short of its outer face.

A locking head or bolt 21 is mounted for axial sliding movement on flange 16, the radially inner face 22 of this head conforming to and having flush engagement with the flange 16 in the sliding movement. The head 21 is provided with a central clamping lug 23 at the axially inner and radially outermost portion thereof. The lug 23 is of the same cross sectional shape as the notch 20 in the rail 12, so as to have snugly nested engagement therein when the clamping head 21 is in the operative position shown in Fig. 3.

An actuator stud or stem 24 is rotatively received in an axially extending bore 25 through the head 21. This stem constitutes an actuator or control element for the clamp, and has a hex bolt operating portion 26 on the outer side of the device 13. The stem 24 is knurled at 27 intermediate its length, i.e., immediately adjacent the inner side of clamping head 21, which fixedly receives a cylindrical camming actuator member 28 of special outline. It is seen from the above that the member 28 will be rotated as a unit upon rotation of stem 24, and that the stud, clamping head 21 and camming member 28 are movable axially as a unit in the engagement and disengagement of the lug 23 of head 21 in relation to the rail 12.

The stem 24 extends axially inwardly through a bore 29 of a further cam actuator member 30 similar to the member 28, which member 30 is fabricated as an integral part of the bracket 17, inwardly overhanging the wheel body flange 16. A snap ring 31 may be applied to the stem 24 on the inner side of the fixed cam member 30 to hold the other parts in assembly.

The adjacent axially disposed surfaces of the respective rotative and fixed cam actuator members 28, 30 surrounding their bores are formed to provide complementary cam faces 32, 33, respectively. The respective cam surfaces are symmetric about a radial plane in their position shown in Fig. 3 and extend continuously about the respective bores in the cam members through which the stem 24 extends.

In the position of the parts shown in Figs. 1, 2 and 3, the rises of the respective cam surfaces 32, 33 are axially opposed and in engagement with one another, causing the clamping lug 23 of head 21 to be held axially outwardly in clamping engagement in a notch 20 of the rail 12. When it is desired to release the clamp 13 for an adjustment of the rim 11, a suitable wrench is applied to the hex portion 26 of stem 24 to turn it one-revolution only. This brings the cam faces 32, 33 into a complementary angular mating relationship since the cam member 28 is rotatable as a unit with the stem 24. A slight tap upon the stem 24 will shift the clamping lug 23 axially inwardly to the released position shown in Fig. 4, in which the contour of the fixed cam face 33 nestingly receives that of the cam face 32. A reverse 180° rotation restores the parts to the reclamping position of Fig. 3, the head 21 being cammed to that position by the relatively rotating cam faces 32, 33.

For the purpose of selectively controlling the relative rotatable adjustment of the wheel body and rim, the rails 12 are formed with the equally spaced transverse holes 34 for engagement by suitable shoulder pins, which are adapted to be engaged by the adjacent edges of the guide lugs 14, 15. Proper registry of the clamping head 21 with the rail notches 20 in any adjusted position of the rim is thus insured.

In the modified adaptation of the invention illustrated in Figs. 5, 6 and 7 a similar principle is involved with the addition of spring means automatically releasing the clamping head.

As illustrated in Figs. 5, 6 and 7, the variable tread adjusting device incorporating the quick release clamps of the invention is generally designated 35. It comprises a member 36 having end flanges 37 by which it is rigidly secured in flush engagement with the external surface of the flange 16 of wheel body 10. The member 36 has a radially outwardly projecting rail guide or abutment 38 on the inner axial side of the inclined cam rail 12 and, in axially opposed relation thereto, an outer abutment or guide 39 at the opposite side of the rail 12. The rim 11 is shifted axially by camming engagement between the abutment members 38, 39 in the same way as the previous form.

The rail 12 has a series of clamping notches 20 similar to those previously described, and an axially sliding clamping head 40 is provided with a radially outward, tapered locking formation 41, similar in shape to the clamp lug 23 of the first form, for releasable engagement in the notch 20.

The clamping head 40 is formed with an integral axially outwardly extending stem 42 which projects through an axial bore 43 in the member 36, which has an integral portion 44 in bracing engagement with the outer surface of wheel body 10. The outer axial surface of the member 36 is formed as a fixed annular cam face 45 surrounding the bore 43, similar to the cam face 33 of the fixed cam member 30 of the first embodiment.

The stem 42 rotatively receives an outer cam member 46, which has an annular cam face 47 surrounding the stem, being similar to the cam face 32 of the camming member 28 the first embodiment. As in that embodiment, the cam faces 45, 47 are symmetric about a radial plane through stem 42, in their positions shown in Figs. 5 and 6. A split retaining ring 48 is applied to stem 42 outwardly of cam member 46 to hold the same in place. Cam member 46 is the actuator for the clamp, and has a hex outline for turning by a wrench.

A coil compression spring 49 encircles the stem 42 between the member 36 and the clamping head 40, being received in a recess 50 of the member 36. It is apparent that a half turn of the cam member 46 will shift it from the clamping position of Fig. 5 to the releasing position of Fig. 7, whereupon the compressed spring 49 will urge clamp head 40 outwardly and disengage its locking formation 41 from the notch 20.

The cam member 46 is operated through another 180° increment to restore the head 41 to rail clamping position, following axial adjustment as desired, to bring the cam surfaces 45, 47 to reclamping position.

The invention affords a simple and effective quick acting clamp for adjustable tread wheels, which enables release and reclamping of the parts before and after adjustment with but a twist of the operator's wrist in each instance. By comparison with existing lock-up means, the time and labor required are but a fraction of the time and labor heretofore expended for the purpose.

What I claim as my invention is:

1. In combination, a variable tread wheel including a wheel body and a coaxial rim which have guide and rail means carried respectively thereby and coacting to render the same relatively adjustable axially upon relative rotation thereof, and quick acting clamping means for said body and rim, comprising a clamp element axially positionable on said wheel body in and out of locking relation to the rim, and a manually rotatable actuator operatively connected to and operating said clamp element into or out of said locking relation in a partial turn of said actuator, said wheel body and actuator having axially engaging camming surfaces in axially aligned relation to one another and in sliding engagement upon rotative manipulation of said actuator.

2. An adjustable tread wheel structure, comprising a wheel body, a rim coaxial therewith, a cam rail secured on the inner periphery of said rim and extending circumferentially thereof at a slight axial inclination thereto, a guide on said wheel body in slidable cam engagement with said rail upon relative rotation of the rim and body, a clamp member slidable axially on said wheel body into and out of locking engagement with said rail, a rotatable stem operatively engaged with said clamp member and slidable axially therewith, an actuator member fixed on said wheel body and rotatively receiving said stem, a further actuator member movable axially on said body and rotatable with said stem, said actuator members having similarly shaped, axially engaging cam faces to effect axial movement of said further actuator member upon rotation of said stem.

3. An adjustable tread wheel structure, comprising a wheel body, a rim coaxial therewith, a cam rail secured on the inner periphery of said rim and extending circumferentially thereof at a slight axial inclination thereto, a guide on said wheel body in slidable cam engagement with said rail upon relative rotation of the rim and body, a clamp member slidable axially on said wheel body into and out of locking engagement with said rail, a stem operatively engaged with said clamp member and slidable axially therewith, an actuator member fixed on said wheel body and axially receiving said stem, a further actuator member movable axially on said body and rotatable on said stem, said further actuator member being connected to said stem to shift the same axially, said actuator members having similarly shaped, axially engaging cam faces to effect axial movement of said further actuator member upon rotation thereof.

References Cited in the file of this patent

UNITED STATES PATENTS

| | | |
|---|---|---|
| 1,001,802 | Baker | Aug. 29, 1911 |
| 1,329,289 | Carter | Jan. 27, 1920 |
| 1,440,190 | Webb | Dec. 26, 1922 |
| 1,581,639 | Kaplan | Apr. 20, 1926 |
| 2,417,139 | Strehlow | Mar. 11, 1947 |
| 2,793,913 | Stough | May 28, 1957 |